United States Patent [19]
Kikuchi

[11] Patent Number: 6,151,150
[45] Date of Patent: Nov. 21, 2000

[54] METHOD AND APPARATUS FOR LEVEL DECISION AND OPTICAL RECEIVER USING SAME

[75] Inventor: Osamu Kikuchi, Tokyo, Japan

[73] Assignee: Oki Electric Industry Co., Ltd., Tokyo, Japan

[21] Appl. No.: 08/942,619

[22] Filed: Oct. 2, 1997

[30] Foreign Application Priority Data

Oct. 3, 1996 [JP] Japan .................................. 8-262624
Feb. 27, 1997 [JP] Japan .................................. 9-044073

[51] Int. Cl.$^7$ .................................................. H04B 10/06
[52] U.S. Cl. ......................... 359/194; 359/189; 375/317; 375/318; 375/319
[58] Field of Search .................................. 359/189, 194; 375/317, 318, 319

[56] References Cited

U.S. PATENT DOCUMENTS

| | | | |
|---|---|---|---|
| 5,025,456 | 6/1991 | Ota et al. | 375/76 |
| 5,612,810 | 3/1997 | Inami et al. | 359/189 |
| 5,892,609 | 4/1999 | Saruwatari | 359/189 |

*Primary Examiner*—Leslie Pascal
*Assistant Examiner*—Vu Lieu
*Attorney, Agent, or Firm*—Rabin & Champagne, P.C.

[57] ABSTRACT

In a method for deciding the level of an input signal, positive and negative signals are provided in response to the input signal. A peak of the positive signal is detected to provide a positive-peak value. A peak of the negative signal is detected to provide a negative-peak value. The positive signal and the negative-peak value are combined to provide a first combination signal. The negative signal and the positive-peak value are combined to provide a second combination signal. The first and second combination signals are compared to provide an output signal of zero or one.

3 Claims, 7 Drawing Sheets

METHOD AND APPARATUS FOR LEVEL DECISION AND OPTICAL RECEIVER USING SAME

CROSS REFERENCE TO RELATED APPLICATION

This application claims the priority of Applications No. H09-044073, filed Feb. 27, 1997 and H08-262624 filed Oct. 3, 1996 both in Japan. The subject matter of each application is incorporated herein by reference.

TECHNICAL FIELD OF THE INVENTION

The present invention relates to a signal transmission system, and more particularly to a level decision circuit used in a signal receiver.

BACKGROUND OF THE INVENTION

For realizing an all-optical subscriber network, the PDS (Passive Double Star) technique has been considered to be useful and important, in which variety types of multiplexing schemes are used. In a PDS subscriber network system, it is required to use an optical receiver which performs AGC (Automatic Gain Control) or ATC (Automatic Threshold Control) to process burst mode optical signals. Such an optical receiver includes a level decision circuit, which decides the level of the input signal to generate a digital output signal of zero or one.

In a PON (Passive Optical Network) system, burst mode signals are transmitted from a transmitter to the optical receiver. For maintaining a high transmission rate in the PON system, it is required to start a level decision operation within the first several bits in the burst mode signal. According to a conventional level decision circuit, however, in order to maintain a high transmission rate, the structure of the circuitry becomes complicated. Further, the duty ratio becomes worse and an output error may occur frequently.

OBJECTS OF THE INVENTION

Accordingly, an object of the invention is to provide method and apparatus for level decision which is easily designed to be simple so as to realize a quick start of a level decision process without duty distortion and without output errors.

Another object of the invention is to provide an optical receiver in which a level decision circuit is designed to be simple so as to realize a quick start of a level decision process without duty distortion and without output errors.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the invention, a method for deciding the level of an input signal includes the step of providing positive and negative signals in response to the input signal. The method further includes the steps of: detecting a peak of the positive signal to provide a positive-peak value; detecting a peak of the negative signal to provide a negative-peak value; combining the positive signal and the negative-peak value to provide a first combination signal; and combining the negative signal and the positive-peak value to provide a second combination signal. The method still further includes the step of comparing the first and second combination signals to provide an output signal of zero or one.

According to a second aspect of the invention, a level decision circuit includes a differential amplifier which generates positive and negative signals in response to an input signal; a first peak detector which detects a peak of the positive signal to provide a positive-peak value; and a second peak detector which detects a peak of the negative signal to provide a negative-peak value. The circuit further includes a first adder which combines the positive signal and the negative-peak value to provide a first combination signal; and a second adder which combines the negative signal and the positive-peak value to provide a second combination signal. The circuit still further includes a comparator which compares the first and second combination signals to provide an output signal of zero or one.

According to a third aspect of the invention, an optical receiver, which generates an electrical digital signal from an optical signal, includes an O/E converter which converts the optical signal into an electrical input signal and a level decision circuit, which includes the same elements as the second aspect of the invention.

DETAILED DISCLOSURE OF THE INVENTION

Figure 1:
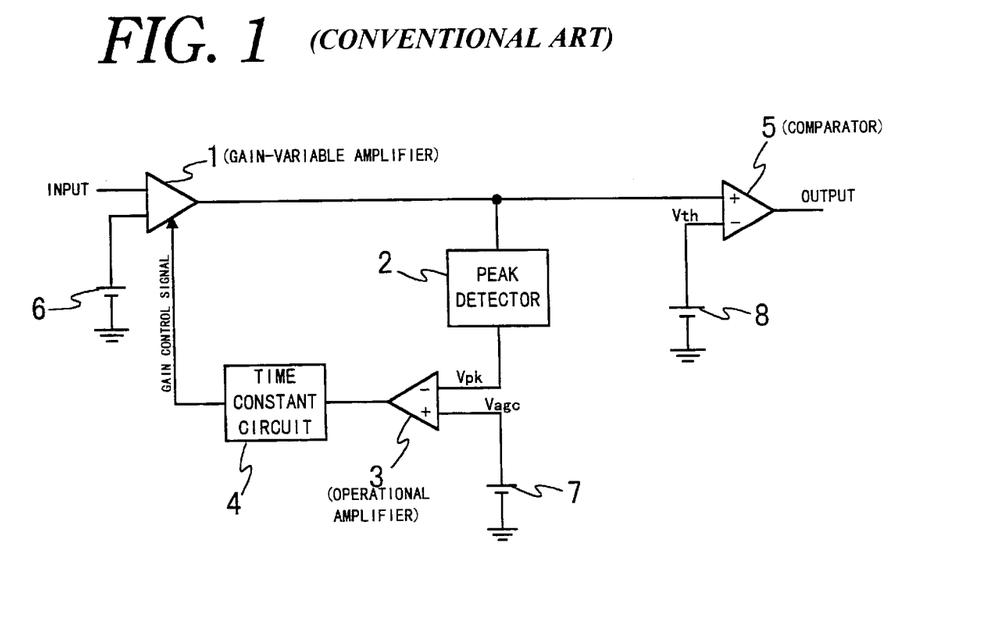
FIG. 1 is a circuit diagram showing a conventional level decision circuit using an AGC scheme.

For better understanding of the invention, background technology is first described. FIG. 1 shows a conventional level decision circuit using an AGC (Automatic Gain Control) scheme, which is generally mounted in an optical receiver. The level decision circuit includes a gain-variable amplifier 1, which receives an input signal and amplifies it in accordance with a controlled gain level. The gain-variable amplifier 1 is connected at an output terminal to a peak detector 2, which detects a peak voltage "Vpk" of the output signal of the gain-variable amplifier 1, and to an input terminal of a comparator 5. The peak detector 2 is connected at an output terminal to an input terminal of an operational amplifier 3, of which the other input terminal is connected to a control voltage source 7.

The operational amplifier 3 compares the peak voltage "Vpk" and a control voltage "Vagc," supplied from the control voltage source 7, to generate a gain control signal so that the peak voltage "Vpk" approximates the control voltage "Vagc." The operational amplifier 3 is connected at an output terminal to a time constant circuit 4, which generates a time constant "τ a" for gain control of the gain-variable amplifier 1. The time constant circuit 4 is connected at an output terminal to the gain-variable amplifier 1. The gain-variable amplifier 1 is also supplied with a reference voltage from a reference voltage source 6. The comparator 5 is supplied with a threshold voltage "Vth" from a reference voltage source 8. The threshold voltage "Vth" is determined suitably to provide the maximum SIN ratio between the control voltage "Vagc" and the output level of the gain-variable amplifier 1 in the condition of no input. The comparator 5 compares the output level of the gain-variable amplifier 1 to the threshold voltage "Vth" to output a digital signal of zero or one.

Figure 2:
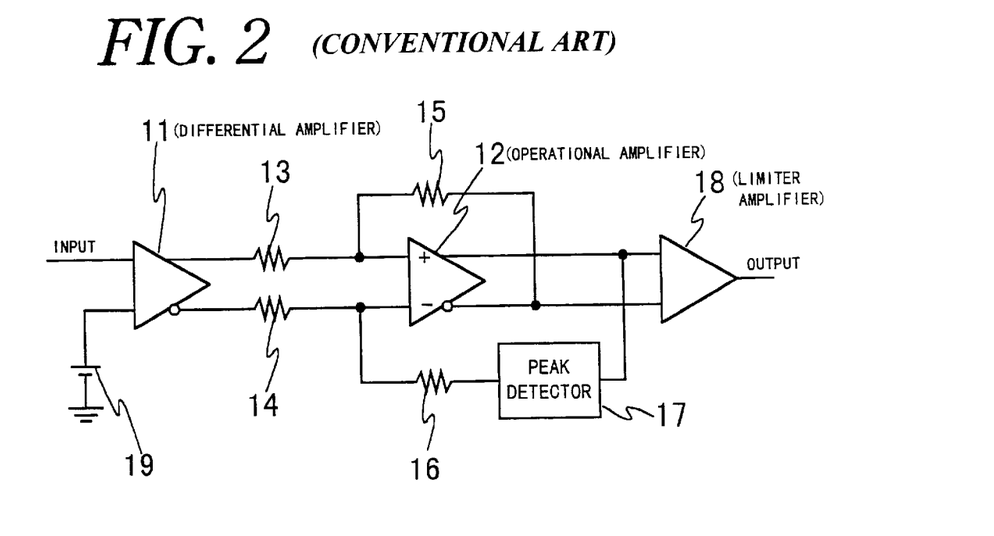
FIG. 2 is a circuit diagram showing another conventional level decision circuit using an ATC scheme.

FIG. 2 shows another conventional level decision circuit using ATC (Automatic Threshold Control) scheme, which includes a differential amplifier 11 to which an input signal is supplied. The differential amplifier 11 is connected at positive and negative output terminals to one end of each of resistors 13 and 14, respectively. The resistor 13 is connected at its other end to an input terminal of an operational amplifier 12 and a resistor 15. The resistor 14 is connected at its other end to the other input terminal of the operational amplifier 12 and a resistor 16. The operational amplifier 12 is connected at positive and negative output terminals to input terminals of a limiter amplifier 18. The positive output terminal of the operational amplifier 12 is also connected to a peak detector 17, whose output terminal is connected to one of the input terminals of the operational amplifier 12. The other end of the resistor 15 is connected to the input terminal of the limiter amplifier 18, which is also connected to the negative output terminal of the operational amplifier 12. The differential amplifier 11 is connected at the other input terminal to a reference voltage source 19, which is grounded.

In the conventional level decision circuit shown in FIG. 2, negative feedback is provided to the operational amplifier 12 to detect a mid-point voltage of the input signal. An example of this kind of level decision circuit is described in a report "DC Coupled Burst Mode Optical Receiver with High Speed ATC Circuit," B-717 Nagahori et al., 1992 Autumn Conference of The Institute of Electronics, Information and Communication Engineers.

Figure 3:
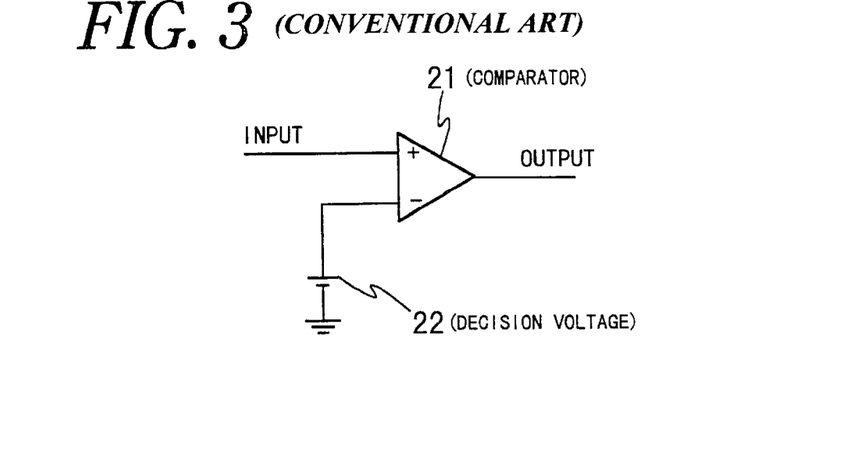
FIG. 3 is a circuit diagram showing still another conventional level decision circuit.

FIG. 3 shows another conventional level decision circuit, which includes a comparator 21 to which an input signal is supplied, and a decision voltage source 22 connected to an input terminal of the comparator 21. The decision voltage source 22 provides a fixed voltage that is determined to be slightly higher than the minimum level of the input signal. The comparator 21 compares the input signal to the decision voltage to generate an output signal of zero or one.

Figure 4:
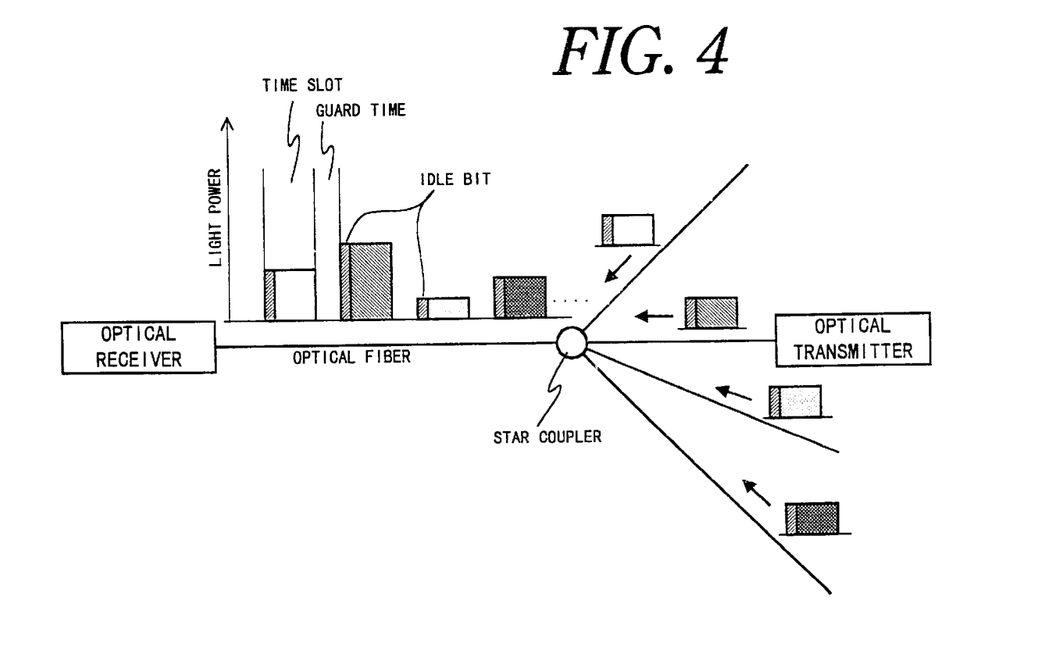
FIG. 4 is an explanatory view showing a PON system.

FIG. 4 shows a PON (Passive Optical Network) system including an optical receiver to which the above-mentioned level decision circuit can be applied. In the PON system, burst mode signals are supplied from an optical transmitter. The burst mode signals are transmitted through a star coupler and an optical fiber to the optical receiver. The burst mode signal is a signal whose level (light power) varies for each time slot. For maintaining a high transmission rate in the PON system, it is required to start a level decision operation within first several bits in the burst mode signal.

When the conventional level decision circuits are applied to the PON system, the following disadvantages arise:

In the conventional level decision circuit shown in FIG. 1, it is required that the time constant "τ a" is determined to be very low in order to maintain a high transmission efficiency. Further, it is required that the gain of the gain-variable amplifier 1 and the gain of the operational amplifier 3 are determined to be lower to provide enough phase margin for preventing the occurrence of oscillation. If the gain of the gain-variable amplifier 1 and the operational amplifier 3 are set low, the error between the control voltage "Vagc" and the peak voltage of the output signal of the gain-variable amplifier 1 becomes large. Therefore, a great effort for circuit design is needed.

In the conventional level decision circuit shown in FIG. 2, the negative feedback is made with the resistors 13 to 16 and the peak detector 17, so that an ATC operation starts quickly. However, it is required to perform phase compensation on the circuitry for preventing the occurrence of oscillation. As a result, the structure of the circuitry becomes complicated, as in the case of the level decision circuit shown in FIG. 1.

Figure 5A:
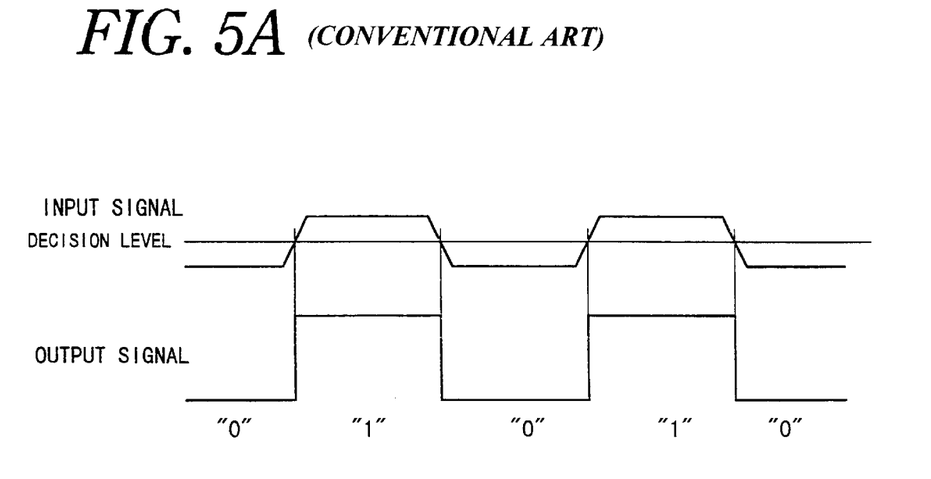
FIGS. 5A and 5B are timing charts showing the operation of the conventional level decision circuit shown in FIG. 3.
Figure 5B:
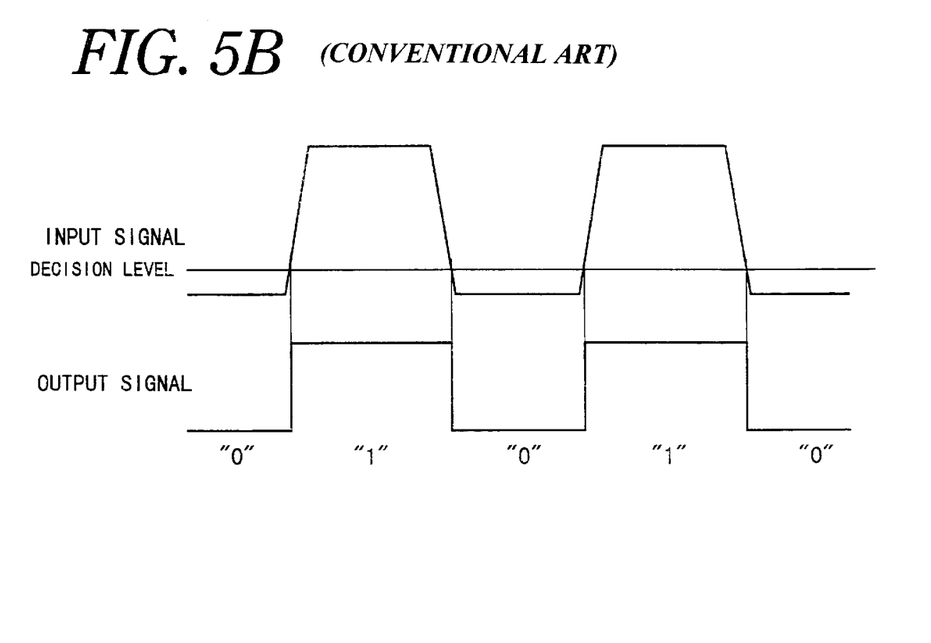

In the conventional level decision circuit shown in FIG. 3, the level decision process can be started with the first bit of the input signal, because no feedback circuit is used, and therefore the circuitry can be designed simply. However, the error rate does not get remarkably better even if the amplitude of the input signal is set high, because the decision voltage is fixed. FIG. 5A shows the relationship between the input signal level and the output signal level when the input signal has a lower amplitude. FIG. 5B shows the relationship between the input signal level and the output signal level when the input signal has a higher amplitude. As can be understood from the drawings, the duty distortion appears remarkable when the input signal has a higher amplitude.

In addition, if an unexpected offset voltage is applied between the input signal and the reference voltage, an output error occurs easily in any of the conventional level decision circuits shown in FIGS. 1 to 3.

Figure 6:
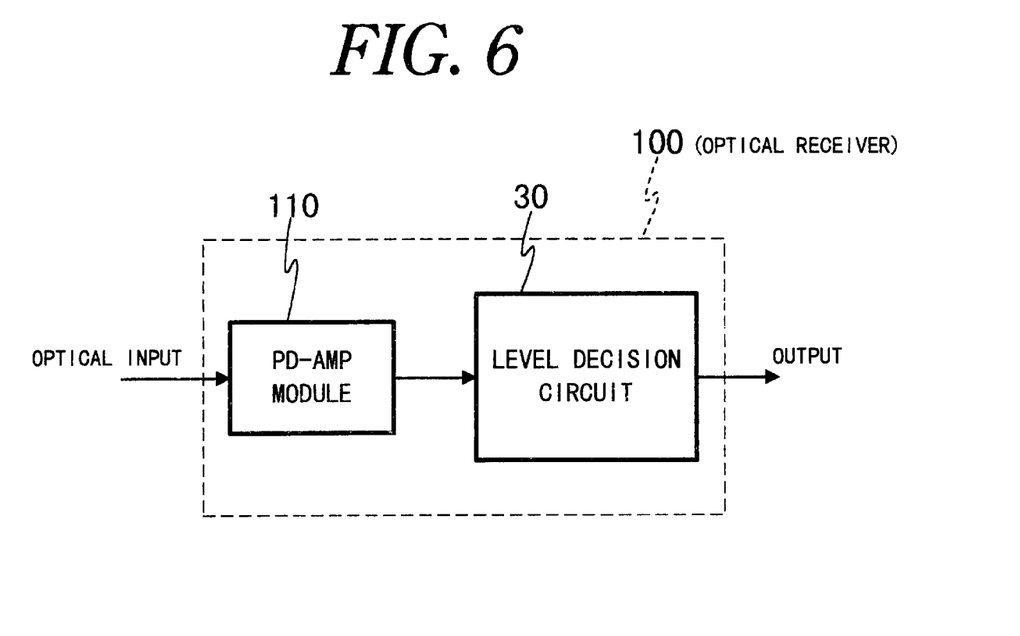
FIG. 6 is a block diagram showing an optical receiver to which the invention is applied.

FIG. 6 shows the structure of an optical receiver 100, which includes a PD-AMP module 110 and a level decision circuit 30. The PD-AMP module 110 includes a photo-diode, which converts an optical input signal into an electrical signal, and a pre-amplifier, which amplifies the electrical signal. The level decision circuit 30 generates a digital output signal in response to the electrical signal supplied from the PD-AMP module 110.

Figure 7:
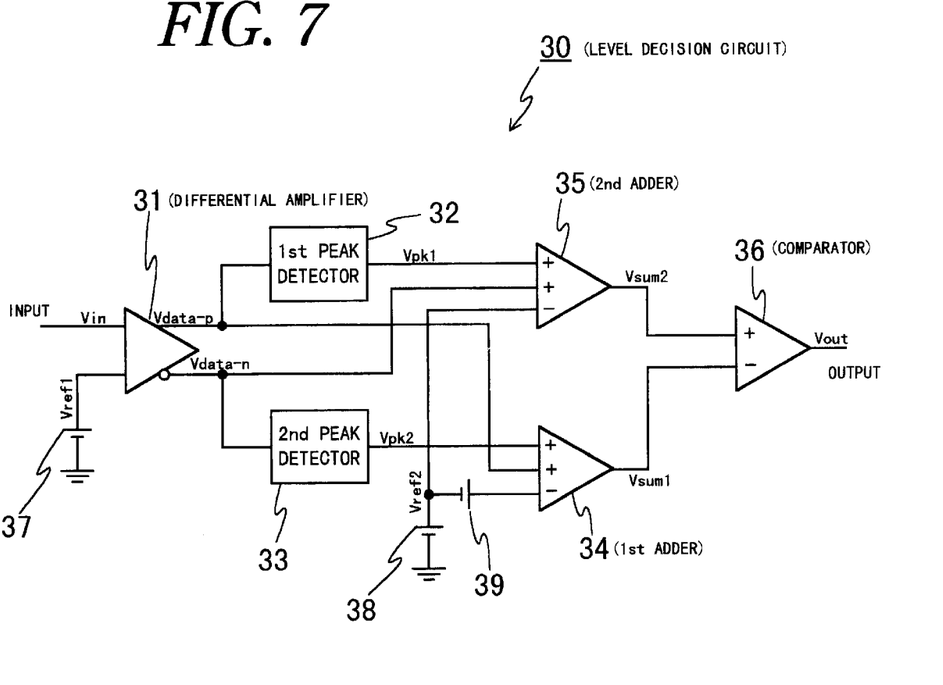
FIG. 7 is a circuit diagram showing the structure of a level decision circuit according to a first preferred embodiment of the invention.

FIG. 7 shows the structure of the level decision circuit 30, according to a first preferred embodiment of the invention. The level decision circuit 30 includes a differential amplifier 31, to which an input signal (electrical signal) "Vin" is supplied. The other input terminal of the differential amplifier 31 is connected to a first reference voltage source 37. The differential amplifier 31 is connected at a positive output terminal to an input terminal of a first peak detector 32 and an input terminal of a first adder 34. A negative output terminal of the differential amplifier 31 is connected to an input terminal of a second peak detector 33 and an input terminal of a second adder 35. The first peak detector 32 is connected at an output terminal to another input terminal of the second adder 35. The second peak detector 33 is connected at an output terminal to another input terminal of the first adder 34. The first adder 34 is connected at the other input terminal to an offset voltage source 39, which is connected to a second reference voltage source 38. The second adder 35 is connected at the other input terminal to the second reference voltage source 38. The output terminals of the first and second adders 34 and 35 are connected to negative and positive input terminals of a comparator 36, respectively.

Figure 8:
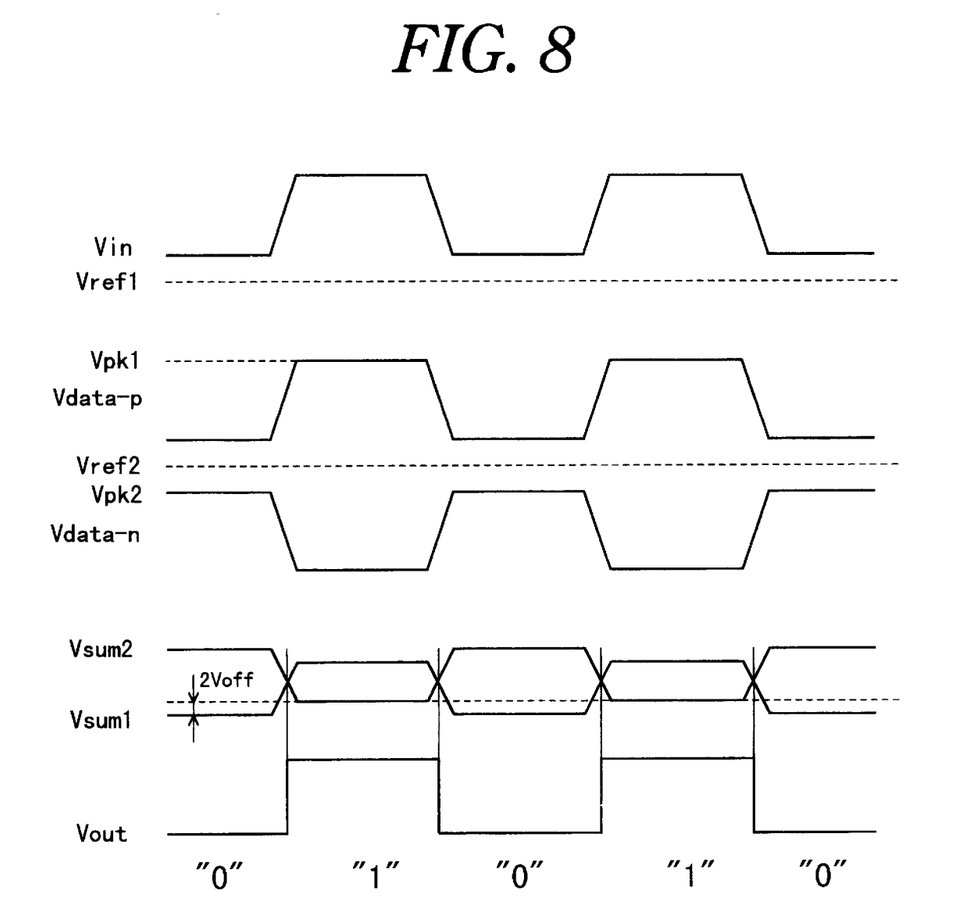
FIG. 8 is a timing chart showing the operation of the first preferred embodiment.

Next, the operation of the level decision circuit 30 is described in conjunction with FIG. 8. The input signal "Vin" is amplified by the differential amplifier 31 to provide positive and negative signals "Vdata-p" and "Vdata-n," which have the same amplitude in the opposite logic. The first and second peak detectors 32 and 33 detect peak voltage values "Vpk1" and "Vpk2" of the positive signal Vdata-p and negative signal Vdata-n, supplied from the differential amplifier 31, respectively. The first adder 34 combines (sums) the positive signal Vdata-p and the peak voltage "Vpk2" using a reference voltage of "Vref2+Voff" to provide a first sum-voltage signal (combination signal) "Vsum1." The second adder 35 combines (sums) the negative signal Vdata-n and the peak signal "Vpk1" using a reference voltage of "Vref2" to provide a second sum-voltage signal (combination signal) "Vsum2." The sum-voltage signal "Vsum1" and "Vsum2" are in the opposite logic to each other, and have bottom levels (offset levels) that differ from each other by 2Voff. The comparator 36 compares the sum-voltage signals "Vsum1" and "Vsum2" to provide a digital output signal "Vout" of zero or one. When input signals of zero are successively inputted, the offset voltage source 39 provides a micro-offset voltage "Voff" to shift the reference level so that the first sum-voltage signal "Vsum1" becomes 2Voff lower than the second sum-voltage signal "Vsum2." As a result, the signal level zero is accurately decided (identified).

In the above-mentioned embodiment, the mid-point voltage "Vref2" of the output of the differential amplifier 31 is used as the reference voltage for the summing operation. The reference voltage, however, is not limited by the mid-point voltage "Vref2" of the output of the differential amplifier 31, but can be any other voltage in the dynamic range of the adders 34 and 35. In the level decision circuit 30, different types of differential amplifiers, peak detectors and adders can be used. Any values of reference voltages, offset voltage and signal level do not limit the invention.

According to the embodiment, the differential amplifier 31, peak detectors 32 and 33, adders 34 and 35, and comparator 36 are serially connected without negative feedback circuits. Therefore, it is easy to design the circuitry simple to realize a quick start of level decision process. Further, the sum-voltage signals "Vsum1" and "Vsum2" have substantially the same bottom level, as shown in FIG. 8, so that the comparator 36 supplies the output signal "Vout" without duty distortion. In addition, even if the offset voltage between the input signal "Vin" and the reference voltage "Vref1" is large, the level decision process can be performed without output errors.

Figure 9:
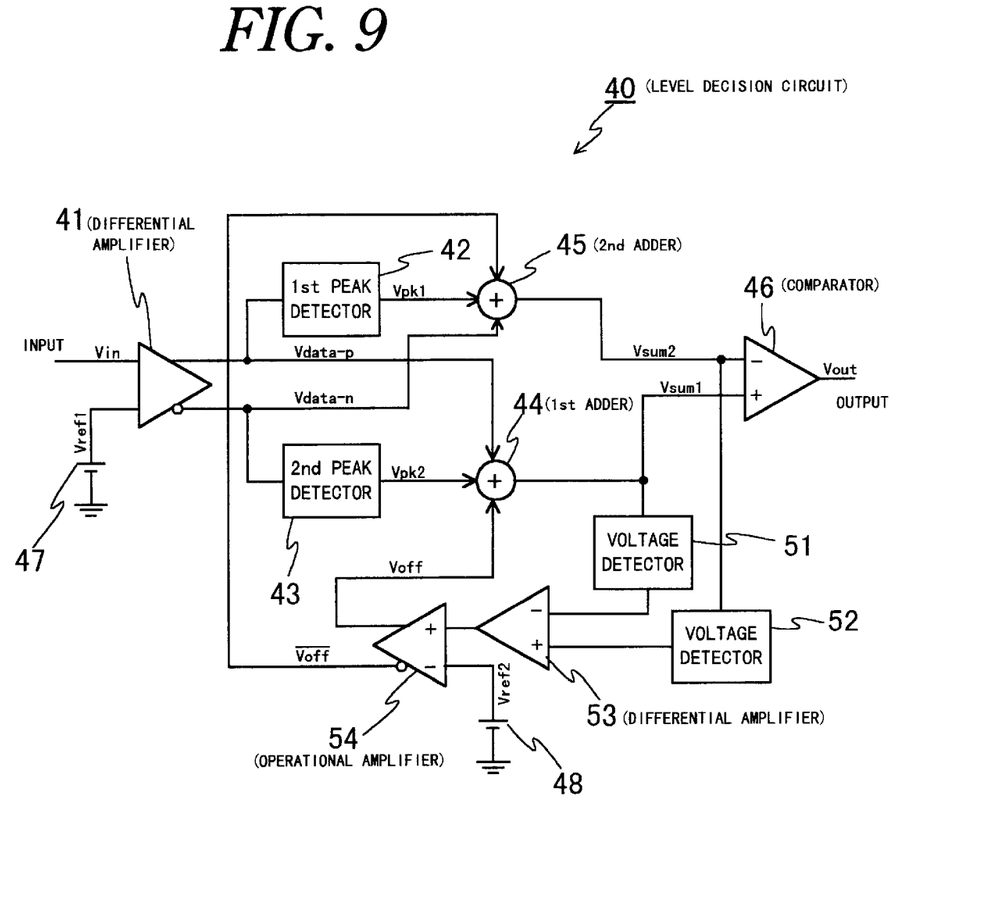
FIG. 9 is a circuit diagram showing the structure of a level decision circuit according to a second preferred embodiment of the invention.

FIG. 9 shows the structure of a level decision circuit 40, according to a second preferred embodiment of the invention. The level decision circuit includes a differential amplifier 41, to which an input signal (electrical signal) "Vin" is supplied. The other input terminal of the differential amplifier 31 is connected to a first reference voltage source 47. The differential amplifier 41 is connected at a positive output terminal to an input terminal of a first peak detector 42 and to an input terminal of a first adder 44. A negative output terminal of the differential amplifier 41 is connected to an input terminal of a second peak detector 43 and to an input terminal of a second adder 45. The first peak detector 42 is connected at an output terminal to another input terminal of the second adder 45. The second peak detector 43 is connected at an output terminal to another input terminal of the first adder 44. The first adder 44 is connected at the other input terminal to a positive output terminal of an operational amplifier 54. The second adder 45 is connected at the other input terminal to a negative output terminal of the operational amplifier 54. The output terminals of the first and second adders 44 and 45 are connected to negative and positive input terminals of a comparator 46, respectively. The first adder 44 is also connected at an output terminal to an input terminal of a voltage detector 51. The second adder 45 is also connected at an output terminal to an input terminal of a voltage detector 52. The output terminals of the voltage detector 51 and 52 are connected to negative and positive input terminals of a differential amplifier 53, respectively. The operational amplifier 54 is connected at input terminals to an output terminal of the differential amplifier 53 and to a second reference voltage source 48. The second reference voltage source 48 supplies an offset voltage to sum-voltage signals (combination signals) outputted from the first and second adders 44 and 45.

The input signal "Vin" is amplified by the differential amplifier 41 to provide positive and negative signals Vdata-p and Vdata-n, which have the same amplitude in the opposite logic. The first and second peak detectors 42 and 43 detect peak voltage signals "Vpk1" and "Vpk2" of the positive signal Vdata-p and negative signal Vdata-n, supplied from the differential amplifier 41, respectively. The first adder 44 combines (sums) the positive signal Vdata-p, the peak voltage "Vpk2" and "Voff" to provide the sum-voltage signal "Vsum1." The second adder 45 combines the negative signal Vdata-n, the peak voltage "Vpk1" and Voff to provide the sum-voltage signal "Vsum2." The comparator 46 compares the signals "Vsum1" and "Vsum2" to provide a digital output signal "Vout" of zero or one. The voltage detectors 51 and 52 detect the output voltages of the first and second adders 44 and 45. The differential amplifier 53 generates a feedback voltage in response to the output signals of the voltage detectors 51 and 52. The operational amplifier 54 supplies the feedback voltage signals to the first and second adders 44 and 45.

In FIG. 9, each of the first and second adders 44 and 45 has a single output, however, each adder may have two output terminals. That is, each adder has positive output terminal and a negative output terminal. For instance, the first adder 44 may output signals of "Vsum1" and inverted-Vsum1, and the mid-point of the two output signals is generated by a resistance-division technique, or the like. The mid-point voltage is supplied to the differential amplifier. According to this modification, a stable offset voltage, which is the difference between the signals "Vsum1" and "Vsum2" can be applied to the comparator 46 without affecting a difference in a DC bias between the two adders, which occurs with temperature variation.

In another modification, bottom detector circuits may be used instead of the voltage detectors 51 and 52. The output signals of the bottom detector circuits are supplied to the differential amplifier. According to this modification, a more stable offset voltage, which is the difference between the signals "Vsum1" and "Vsum2," can be provided without affecting the differences in DC bias and gain between the two adders, and other errors.

In the above-mentioned embodiment, the output voltage of the adders 44 and 45 are applied to the differential amplifier 53, and the output of the differential amplifier is supplied to the operational amplifier 54. The voltage source 48 provides an offset voltage between the signals "Vsum1" and "Vsum2." The operational amplifier 54 outputs offset voltage signals "Voff" and inverted-Voff, which are supplied to the first and second adders 44 and 45, respectively. Such feedback signals function as a micro-offset voltage to shift the reference level when input signals of zero are successively inputted, so that the output signal of zero is accurately outputted. Accordingly, the level decision circuit operates stably even if a signal of zero is inputted.

According to the embodiment, it is easy to design the circuitry to be simple, to realize a quick start of a level decision process. The level decision process can be performed without output errors and duty distortion.

The level decision circuits 30 and 40 are suitable for an optical receiver of a PON system, which processes burst mode signals whose level (light power) varies for each time slot. The invention is applicable to a signal receiver in a LAN (Local Area Network) system using TDMA (Time Division Multiple Access) scheme. Further, the invention is applicable to any kinds of signal receiver which receives digital signals.

Although the invention has been described with respect to the specific embodiments for complete and clear disclosure, the appended claims are not be thus limited but are to be construed as embodying all modification and alternative constructions that may occur to one skilled in the art which fairly fall within the basic teaching herein set forth.

What is claimed is:

1. A method for deciding the level of an input signal, comprising the steps of:

providing positive and negative signals in response to the input signal;

detecting a peak of the positive signal to provide a positive-peak value;

detecting a peak of the negative signal to provide a negative-peak value;

combining the positive signal, the negative-peak value and a feedback voltage, to provide a first combination signal;

combining the negative signal, the positive-peak value and the feedback voltage, to provide a second combination signal;

comparing the first and second combination signals to provide an output signal of zero or one;

detecting the voltage levels of the first and second combination signals; and generating the feedback voltage in response to the voltage levels.

2. A level decision circuit, comprising:

a differential amplifier that generates positive and negative signals in response to an input signal;

a first peak detector that detects a peak of the positive signal to provide a positive-peak value;

a second peak detector that detects a peak of the negative signal to provide a negative-peak value;

a first adder that combines the positive signal, the negative-peak value and a feedback voltage, to provide a first combination signal;

a second adder that combines the negative signal, the positive-peak value and the feedback voltage, to provide a second combination signal;

a comparator that compares the first and second combination signals to provide an output signal of zero or one;

a first voltage detector that detects the voltage level of the first combination signal;

a second voltage detector that detects the voltage level of the second combination signal; and a feedback voltage generator that generates the feedback voltage in response to outputs of the first and second voltage detectors, and supplies the feedback voltage to the first and second adders.

3. An optical receiver, which generates an electrical digital signal from an optical signal, comprising:

an O/E converter which converts the optical signal into an electrical input signal; and a level decision circuit which comprises:

(1) a differential amplifier which generates positive and negative signals in response to the electrical input signal;

(2) a first peak detector which detects a peak of the positive signal to provide a positive-peak value;

(3) a second peak detector which detects a peak of the negative signal to provide a negative-peak value;

(4) a first adder that combines the positive signal and the negative-peak value with a feedback signal to provide a first combination signal;

(5) a second adder that combines the negative signal and the positive-peak value with the feedback signal to provide a second combination signal;

(6) a comparator that compares the first and second combination signals to provide an output signal of zero or one;

(7) a first voltage detector that detects the voltage level of the first combination signal;

(8) a second voltage detector that detects the voltage level of the second combination signal; and (9) a feedback voltage generator that generates the feedback voltage in response to the outputs of the first and second voltage detectors, and supplies the feedback voltage to the first and second adders.

* * * * *